United States Patent
Changali et al.

(10) Patent No.: US 8,170,816 B2
(45) Date of Patent: May 1, 2012

(54) PARALLEL ARC DETECTION USING DISCRETE WAVELET TRANSFORMS

(75) Inventors: Sriram Changali, Kerala (IN); John Kenneth Hooker, Louisville, KY (US); Konstantin V. Grigoryan, Louisville, KY (US); Scott Jeffrey Hall, Louisville, KY (US)

(73) Assignee: General Electric Company, Schenectady, NY (US)

( * ) Notice: Subject to any disclaimer, the term of this patent is extended or adjusted under 35 U.S.C. 154(b) by 653 days.

(21) Appl. No.: 12/344,772

(22) Filed: Dec. 29, 2008

(65) Prior Publication Data

US 2010/0165521 A1 Jul. 1, 2010

(51) Int. Cl.
G01R 31/00 (2006.01)

(52) U.S. Cl. ......................................................... 702/58
(58) Field of Classification Search .................... 702/58
See application file for complete search history.

(56) References Cited

U.S. PATENT DOCUMENTS

| | | |
|---|---|---|
| 4,514,709 A | 4/1985 | Nakano et al. |
| 5,185,684 A | 2/1993 | Beihoff et al. |
| 5,185,685 A | 2/1993 | Tennies et al. |
| 5,185,686 A | 2/1993 | Hansen et al. |
| 5,185,687 A | 2/1993 | Beihoff et al. |
| 5,208,542 A | 5/1993 | Tennies et al. |
| 5,223,795 A | 6/1993 | Blades |
| 5,434,509 A | 7/1995 | Blades |
| 5,452,223 A | 9/1995 | Zuercher et al. |
| 5,485,093 A | 1/1996 | Russell et al. |
| 5,506,789 A | 4/1996 | Russell et al. |
| 5,512,832 A | 4/1996 | Russell et al. |
| 5,550,751 A | 8/1996 | Russell |
| 5,561,605 A | 10/1996 | Zuercher et al. |
| 5,578,931 A | 11/1996 | Russell et al. |
| 5,600,526 A | 2/1997 | Russell et al. |
| 5,659,453 A | 8/1997 | Russell et al. |
| 5,682,101 A | 10/1997 | Brooks et al. |

(Continued)

FOREIGN PATENT DOCUMENTS

AU 5878700 A 1/2001

(Continued)

OTHER PUBLICATIONS

Al-Dabbagh et al.; "Improved microprocessor based distribution feeder earth fault protection using pattern recognition"; Proceedings of the Fourth International Conference on Development in Power Protection 1989; pp. 172-176.

(Continued)

*Primary Examiner* — Cindy H Khuu
(74) *Attorney, Agent, or Firm* — Global Patent Operation; Steven G. Midgley (57) ABSTRACT

An apparatus to perform parallel arc fault current interruption (AFCI) is provided. The apparatus includes a current sensing device disposed in the electrical circuit, a detection unit configured to receive an output signal produced by the current sensing device and to output a secondary signal based on the output signal, a microcontroller coupled to the detection unit, configured to receive and to decompose the secondary signal via discrete wavelet transforms to thereby obtain discrete wavelet coefficients, to compute a sum of the discrete wavelet coefficients, and to compare the sum of the discrete wavelet coefficients to a predetermined threshold, and to generate a trip signal when the sensed load current is above a predetermined threshold and the sum of the discrete wavelet coefficients cooperatively indicate that predetermined threshold conditions are satisfied.

17 Claims, 8 Drawing Sheets

U.S. PATENT DOCUMENTS

| | | | |
|---|---|---|---|
| 5,691,869 A | 11/1997 | Engel et al. | |
| 5,726,577 A | 3/1998 | Engel et al. | |
| 5,729,145 A | 3/1998 | Blades | |
| 5,805,397 A | 9/1998 | MacKenzie | |
| 5,815,352 A | 9/1998 | MacKenzie | |
| 5,835,321 A | 11/1998 | Elms et al. | |
| 5,839,092 A | 11/1998 | Erger et al. | |
| 5,933,305 A | 8/1999 | Schmalz et al. | |
| 5,969,920 A | 10/1999 | MacKenzie | |
| 5,982,593 A | 11/1999 | Kimblin et al. | |
| 5,986,860 A | 11/1999 | Scott | |
| 6,031,699 A | 2/2000 | Dollar, II et al. | |
| 6,052,046 A | 4/2000 | Ennis et al. | |
| 6,128,170 A | 10/2000 | Daum | |
| 6,191,589 B1 | 2/2001 | Clunn | |
| 6,195,241 B1 | 2/2001 | Brooks et al. | |
| 6,198,611 B1 | 3/2001 | MacBeth | |
| 6,208,951 B1* | 3/2001 | Kumar et al. | 702/191 |
| 6,232,857 B1 | 5/2001 | Mason, Jr. et al. | |
| 6,239,962 B1 | 5/2001 | Seymour et al. | |
| 6,249,749 B1* | 6/2001 | Tran et al. | 702/66 |
| 6,255,923 B1 | 7/2001 | Mason, Jr. et al. | |
| 6,259,996 B1 | 7/2001 | Haun et al. | |
| D450,660 S | 11/2001 | Seymour et al. | |
| 6,313,642 B1 | 11/2001 | Brooks | |
| 6,362,628 B2 | 3/2002 | MacBeth et al. | |
| 6,373,257 B1 | 4/2002 | MacBeth et al. | |
| 6,377,055 B1 | 4/2002 | MacBeth | |
| 6,388,849 B1 | 5/2002 | Rae | |
| 6,414,829 B1 | 7/2002 | Haun | |
| 6,417,671 B1 | 7/2002 | Tiemann | |
| 6,426,632 B1 | 7/2002 | Clunn | |
| 6,459,273 B1 | 10/2002 | Dollar, II et al. | |
| 6,504,692 B1 | 1/2003 | MacBeth et al. | |
| 6,522,228 B2 | 2/2003 | Wellner et al. | |
| 6,522,509 B1 | 2/2003 | Engel et al. | |
| 6,532,139 B2 | 3/2003 | Kim et al. | |
| 6,538,863 B1 | 3/2003 | MacBeth | |
| 6,542,056 B2 | 4/2003 | Nerstrom et al. | |
| 6,545,574 B1 | 4/2003 | Seymour et al. | |
| 6,556,397 B2 | 4/2003 | Kim et al. | |
| 6,570,392 B2 | 5/2003 | MacBeth et al. | |
| 6,590,754 B1 | 7/2003 | MacBeth | |
| 6,608,741 B1 | 8/2003 | MacBeth | |
| 6,621,669 B1 | 9/2003 | Haun et al. | |
| 6,625,550 B1 | 9/2003 | Scott et al. | |
| 6,628,487 B1 | 9/2003 | MacBeth | |
| 6,633,467 B2 | 10/2003 | MacBeth et al. | |
| 6,642,832 B2 | 11/2003 | Pellon et al. | |
| 6,654,219 B1 | 11/2003 | Romano et al. | |
| 6,678,137 B1 | 1/2004 | Mason, Jr. et al. | |
| 6,703,842 B2 | 3/2004 | Itimura et al. | |
| 6,707,651 B2 | 3/2004 | Elms et al. | |
| 6,720,872 B1 | 4/2004 | Engel et al. | |
| 6,777,953 B2 | 8/2004 | Blades | |
| 6,798,628 B1 | 9/2004 | MacBeth | |
| 6,833,713 B2 | 12/2004 | Schoepf et al. | |
| 6,839,208 B2 | 1/2005 | MacBeth et al. | |
| 6,876,203 B2 | 4/2005 | Blades | |
| 6,882,158 B2 | 4/2005 | Blades | |
| 6,927,579 B2 | 8/2005 | Blades | |
| 6,927,597 B2 | 8/2005 | Kliman et al. | |
| 6,972,937 B1 | 12/2005 | MacBeth et al. | |
| 6,980,407 B2 | 12/2005 | Kawate et al. | |
| 6,999,289 B2 | 2/2006 | MacBeth et al. | |
| 7,009,406 B2 | 3/2006 | Naidu et al. | |
| 7,062,388 B2 | 6/2006 | Rivers et al. | |
| 7,069,116 B2 | 6/2006 | Kunsman et al. | |
| 7,106,069 B2 | 9/2006 | Kim et al. | |
| 7,136,265 B2 | 11/2006 | Wong et al. | |
| 7,148,696 B2 | 12/2006 | Zhou et al. | |
| 7,151,656 B2 | 12/2006 | Dvorak et al. | |
| 7,205,772 B2 | 4/2007 | Naidu et al. | |
| 7,253,637 B2 | 8/2007 | Dvorak et al. | |
| 7,359,168 B2 | 4/2008 | Elms et al. | |
| 7,362,553 B2 | 4/2008 | Elms et al. | |
| 7,391,218 B2 | 6/2008 | Kojori et al. | |
| 7,403,129 B2 | 7/2008 | Zhou et al. | |
| 7,409,303 B2 | 8/2008 | Yeo et al. | |
| 7,463,465 B2 | 12/2008 | Rivers, Jr. et al. | |
| 2001/0033469 A1 | 10/2001 | MacBeth et al. | |
| 2001/0036047 A1 | 11/2001 | MacBath et al. | |
| 2001/0049590 A1* | 12/2001 | Wegerich | 702/189 |
| 2002/0033701 A1 | 3/2002 | MacBath et al. | |
| 2002/0038199 A1 | 3/2002 | Blemel | |
| 2002/0051546 A1 | 5/2002 | Bizjak | |
| 2002/0080003 A1 | 6/2002 | Pellon et al. | |
| 2002/0085327 A1 | 7/2002 | Kim et al. | |
| 2002/0097056 A1 | 7/2002 | Blades | |
| 2002/0130668 A1 | 9/2002 | Blades | |
| 2002/0196031 A1 | 12/2002 | Blades | |
| 2003/0072113 A1 | 4/2003 | Wong et al. | |
| 2003/0074148 A1 | 4/2003 | Dvorak et al. | |
| 2003/0098982 A1 | 5/2003 | McLeod et al. | |
| 2003/0201780 A1 | 10/2003 | Blades | |
| 2003/0205460 A1 | 11/2003 | Buda | |
| 2004/0043255 A1 | 3/2004 | Horai et al. | |
| 2004/0095695 A1 | 5/2004 | Kim et al. | |
| 2004/0100274 A1 | 5/2004 | Gloster et al. | |
| 2004/0150410 A1 | 8/2004 | Schoeqf et al. | |
| 2004/0172207 A1 | 9/2004 | Hancock et al. | |
| 2004/0182697 A1 | 9/2004 | Buda | |
| 2005/0207083 A1 | 9/2005 | Rivers et al. | |
| 2005/0264962 A1 | 12/2005 | Kim et al. | |
| 2006/0015703 A1 | 1/2006 | Ramchandran et al. | |
| 2006/0164097 A1 | 7/2006 | Zhou et al. | |
| 2006/0203401 A1 | 9/2006 | Kojori et al. | |
| 2006/0214670 A1 | 9/2006 | Naidu et al. | |
| 2006/0279883 A1 | 12/2006 | Elms et al. | |
| 2007/0057678 A1 | 3/2007 | Dvorak et al. | |
| 2007/0086124 A1 | 4/2007 | Elms et al. | |
| 2007/0260346 A1 | 11/2007 | Ganesan et al. | |
| 2007/0263329 A1 | 11/2007 | Zhou et al. | |
| 2008/0238404 A1 | 10/2008 | Ferguson | |
| 2009/0088988 A1 | 4/2009 | Muthu-Mannivannan et al. | |
| 2009/0171603 A1* | 7/2009 | Changali et al. | 702/66 |
| 2010/0020451 A1* | 1/2010 | Changali et al. | 361/42 |
| 2010/0157488 A1* | 6/2010 | Hall et al. | 361/42 |

FOREIGN PATENT DOCUMENTS

| | | |
|---|---|---|
| CA | 2248924 A1 | 3/1998 |
| CA | 2334134 A1 | 8/2001 |
| CA | 2336769 A1 | 8/2001 |
| CA | 2337446 A1 | 8/2001 |
| CA | 2307172 A1 | 10/2001 |
| CA | 2549709 A1 | 12/2006 |
| EP | 1126572 A2 | 8/2001 |
| EP | 1126572 A3 | 10/2005 |
| EP | 1329733 B1 | 5/2006 |
| EP | 1657559 A1 | 5/2006 |
| GB | 2381607 A | 5/2003 |
| JP | 2005049326 A | 2/2005 |
| KR | 4042607 A | 11/2002 |
| WO | 9403820 A1 | 2/1994 |
| WO | 9422031 A1 | 9/1994 |
| WO | 9635250 A1 | 11/1996 |
| WO | 2006121496 A1 | 11/2006 |
| WO | 2007032944 A2 | 3/2007 |
| WO | 2007032944 A3 | 3/2007 |
| WO | 2007035488 A2 | 3/2007 |
| WO | 2007035488 A3 | 3/2007 |
| WO | 2007045976 A1 | 4/2007 |
| WO | 2007129213 A1 | 11/2007 |

OTHER PUBLICATIONS

Cristan et al.; "Multitaper Power Spectrum Estimation and Thresholding: Wavelet Packets Versus Wavelets"; IEEE Transactions on Signal Processing, vol. 50, No. 12, Dec. 2002; pp. 2976-2986.

Elkalashy; "Modeling and Detection of High Impedance Arcing Fault in Medium Voltage Networks"; TKK Dissertations 95, Espoo 2007.

Kadiver et al.; "An Adaptive Auto Reclosure Scheme using Wavelet Transform"; University of Tehran, Tehran, Iran.

Lai et al.; "Wavelet Transform Based Relay Algorithm for the Detection of Stochastic High Impedance Faults"; International Conference on Power Systems Transients—IPST 2003 in New Orleans, USA.

Leung; "Predictive Maintenance of Circuit Breakers"; University of Waterloo, Waterloo, Ontario, Canada.

Sedighi et al.; "High impedance fault detection based on wavelet transform and statistical pattern recognition"; IEEE Transactions on Power Delivery, vol. 20, Issue 4, Oct. 2005; pp. 2414-2421.

Sultan et al.; "Detection of high impedance arcing faults using a multi-layer perceptron"; IEEE Transaction on Power Delivery, vol. 7, Issue 4, 1992; pp. 1871-1877.

Wen-Jun Li et al.; "Arc Fault Detection Based on Wavelet Packet"; Proceedings of the Fourth International Conference onMachine Learning and Cybernetics, Guangzhou, Aug. 18-21, 2005; 0-7803-909101/05; 2005 IEEE; pp. 1783-1788.

* cited by examiner

PARALLEL ARC DETECTION USING DISCRETE WAVELET TRANSFORMS

BACKGROUND OF THE INVENTION

1. Field of the Invention

The field of the invention is electrical systems and, more particularly, methods and systems for parallel arc detection in electrical systems.

2. Brief Description of Related Art

Electrical systems in residential, commercial, and industrial applications usually include a panel board for receiving electrical power from a utility source. The power is routed through the panel board to one or more current interrupters such as, but not limited to circuit breakers, trip units, and others.

Each current interrupter distributes the power to a designated branch, where each branch supplies one or more loads with the power. The current interrupters are configured to interrupt the power to the particular branch if certain power conditions in that branch reach a predetermined set point. For example, circuit breakers are used to protect electrical circuitry from damage due to an overcurrent condition, such as an overload condition or a relatively high-level short circuit fault condition.

Many such circuit breakers provide this protection through for example a thermal-magnetic trip device. Such a trip device typically includes a bimetal which, in response to the heating effects of a persistent overcurrent condition, deflects to unlatch a trip mechanism, which in turn opens separable contacts of the circuit breaker to interrupt current flow in the protected circuit. In the event of a relatively high-level short circuit fault condition, a magnetic field is created which causes rapid displacement of a magnetic armature in the circuit breaker which in turn drives a nearly instantaneous actuation of the trip mechanism.

Additionally, some current interrupters can interrupt power due to a ground fault, and are commonly known as ground fault current interrupters (GFCIs). The ground fault condition results when an imbalance of current flows between a line conductor and a neutral conductor, which could be caused by a leakage current or an arcing fault to ground.

Other current interrupters can interrupt power due to an arcing fault, and are commonly known as arc fault current interrupters (AFCIs). Typical examples of AFCIs include but are not limited to: arc fault circuit breakers, branch/feeder arc fault circuit interrupters, outlet circuit arc fault circuit interrupters, cord arc fault circuit interrupters, combination arc fault circuit interrupters, which function as either a branch/feeder or an outlet circuit AFCI; and portable arc fault circuit interrupters.

Arcing faults are defined into two main categories, series arcs and parallel arcs. Series arcs can occur, for example, when current passes across a gap in a single conductor. Conversely, parallel arcs can occur when current passes between two conductors of different potential, such as for example, between a power conductor and a ground. The parallel arc can draw currents in excess of normal rated current in a circuit, but with RMS current values are less than that required to produce a thermal trip. Additionally, the arc voltage and line impedance prevent the parallel arc from drawing peak current levels that are high enough to trigger the instantaneous trip function.

Unfortunately, arcing faults may, for various reasons, not cause a conventional circuit interrupter to trip. The potential for fires to occur from arcs increases as homes become older and electrical wiring deteriorates from age.

Accordingly, need exists for current interrupters and methods for detecting parallel arc faults in AC electrical systems that overcome, alleviate, and/or mitigate one or more of the aforementioned and other disadvantages of prior art systems.

BRIEF SUMMARY OF THE INVENTION

In accordance with an aspect of the invention, an apparatus to perform parallel arc fault current interruption (AFCI) is provided. The apparatus includes a current sensing device disposed in the electrical circuit to sense an electrical load, the current sensing device configured to produce an output signal representative of a load current passing therethrough, and a detection unit, in signal communication with the current sensing device and configured to receive the output signal produced by the current sensing device, the detection unit being configured and disposed to output a secondary signal based on the output signal, and a microcontroller coupled to the detection unit, being responsive to computer executable instructions which, when executed by the microcontroller, cause the microcontroller to receive and to decompose the secondary signal via discrete wavelet transforms to thereby obtain discrete wavelet coefficients, and to compute a sum of the discrete wavelet coefficients, and to compare the sum of the discrete wavelet coefficients to a predetermined threshold, and to generate a trip signal when the sensed load current is above a predetermined threshold and the sum of the discrete wavelet coefficients cooperatively indicate that predetermined threshold conditions for trip signal generation are satisfied.

In accordance with another aspect of the invention, a computer implemented method of performing arc fault current interruption (AFCI) for a circuit is provided. The method includes sensing a load current at a current sensing device in electrical communication with the circuit, generating a secondary signal reflective of a current of the sensed load current at a detection unit in signal communication with the current sensing device, sampling the secondary signal at a predetermined frequency at a microcontroller coupled to the detection unit, determining the magnitude of the secondary signal, computing discrete wavelet coefficients from components of the secondary signal, computing a sum of the discrete wavelet coefficients, comparing the sum of the discrete wavelet coefficients to a predetermined threshold, determining if threshold criteria have been met based on the sum of the discrete wavelet coefficients and the magnitude of the secondary signal and if so, issuing a trip signal to interrupt an operation of the circuit.

In accordance with another aspect of the invention, a computer implemented method of performing arc fault current interruption (AFCI) for a circuit is provided. The method includes decomposing portions of a secondary signal, which is generated at a detection unit as being based on a load current sensed by a current sensing device with which the detection unit is in signal communication, into detailed and approximate coefficients, respectively, using discrete wavelet transforms, with the first portion of the secondary signal determined to have been zero cross sampled, computing a sum of absolute values of the discrete waveform coefficients for the positive and or negative half cycles of the secondary signal, comparing the sum of the absolute values with a first predetermined threshold, or, if a current of the sensed load is below a pre-selected magnitude, integrating the sum of the absolute values over a predetermined coefficient threshold, comparing the value of the integrated sum of the absolute values with a predetermined integrator value threshold, and issuing a trip signal to interrupt an operation of the circuit if a result of the comparison indicates that the corresponding one of the first and second predetermined thresholds is exceeded over a given period of time.

In accordance with another aspect of the invention, a method of operating a current interrupter by detecting parallel arcs is provided. The method includes sensing a load current and generating a current signal therefrom, frequency filtering the current signal, determining a fundamental frequency of the filtered current signal, detecting a zero-cross of the voltage and/or current of the filtered signal, determining the magnitude of the filtered current signal, filtering the current signal and decomposing the filtered current signal to predetermined levels to obtain discrete wavelet coefficients, sampling the filtered current signal during positive and negative half-cycles, computing absolute values of the discrete wavelet coefficients for the sampled filtered current signal for the positive and negative half-cycles, summing the computed absolute values of the discrete wavelet coefficients of the sampled filtered current signal for the positive and negative half-cycles, comparing the sum of the absolute values of the discrete wavelet coefficients of the sampled filtered current signal for the positive and/or negative half-cycles with a predetermined coefficient sum threshold level, determining if threshold criteria for a parallel arc detection have been met based on the 1) comparison of the sum of the absolute values of the discrete wavelet coefficients of the sampled filtered current signal for the positive and/or negative half-cycles with a predetermined coefficient sum threshold level, and 2) the magnitude of the secondary signal, and issuing a trip signal to operate the current interrupter.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining several embodiments of the invention in detail, it is understood that the invention is not limited in its application to the details of the construction and to the arrangements of the components set forth in the following description or illustrated in the drawings. The embodiments described herein are capable of being practiced and carried out in various ways. Also, it is to be understood, that the phraseology and terminology employed herein are illustrative only and should not be regarded as limiting.

The above-described and other features and advantages of the present disclosure will be appreciated and understood by those skilled in the art from the following detailed description, drawings, and appended claims.

BRIEF DESCRIPTIONS OF THE DRAWINGS

Reference is now made briefly to the accompanying drawings in which.

DETAILED DESCRIPTION OF THE INVENTION

The embodiments described herein provide parallel arc fault interruption. An electric arc can be defined in various manners. In the present context, parallel arcs refer to electric breakdowns of a normally nonconductive media, such as air, that produce luminous electrical discharges, such as sparks, which result from current flowing through the normally nonconductive media. Parallel arcs occur between oppositely charged conductors, such as a circuit and a grounded element, and may be characterized by high current spikes and little or no load impedance. The definition is provided for understanding and is not meant to limit the invention; other definitions of electrical arc are applicable as would be understood by one of ordinary skill in the art.

Figure 1:
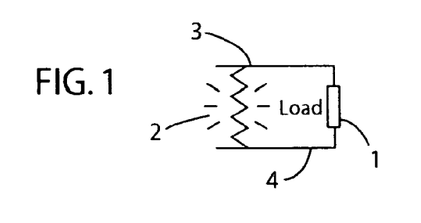
FIG. 1 illustrates a depiction of a parallel arc fault.

Referring to the drawings, and in particular to FIG. 1, a depiction of a typical parallel arc fault is illustrated. As illustrated in FIG. 1, a parallel arc 2 may occur between two oppositely charged conductors 3, 4 such as commonly found across a relatively large impedance 1, or a circuit and a grounded element. Parallel arcs may be characterized by high current spikes and little or no load impedance.

The exemplary embodiments described herein, are directed to the detection and interruption of the parallel arc faults such as the type illustrated in FIG. 1. Also, embodiments of the present use a detection strategy to detect parallel arc faults. The present invention provides for arc fault pattern recognition to differentiate between parallel arc fault current and other non-arcing transient loads currents such as transients caused by, for example, dimmers, drills, fluorescent lamps etc.

Parallel arcing is quenched near the zero crossing of an AC current waveform. Since the arcing is quenched, there is substantially no current flow. Additionally, a dielectric breakdown occurs at a parallel gap and a re-strike of the arcing current occurs by which the arcing current begins to flow again. The re-strike phenomenon is repeated across zero crossing of the current waveform. Generally, the re-strike phenomenon is referred to as re-ignition of the current waveform since the current is reignited as a result of dielectric breakdown of the conducting medium. In the case of the re-strike, the conducting medium is the parallel gap.

Figure 2:
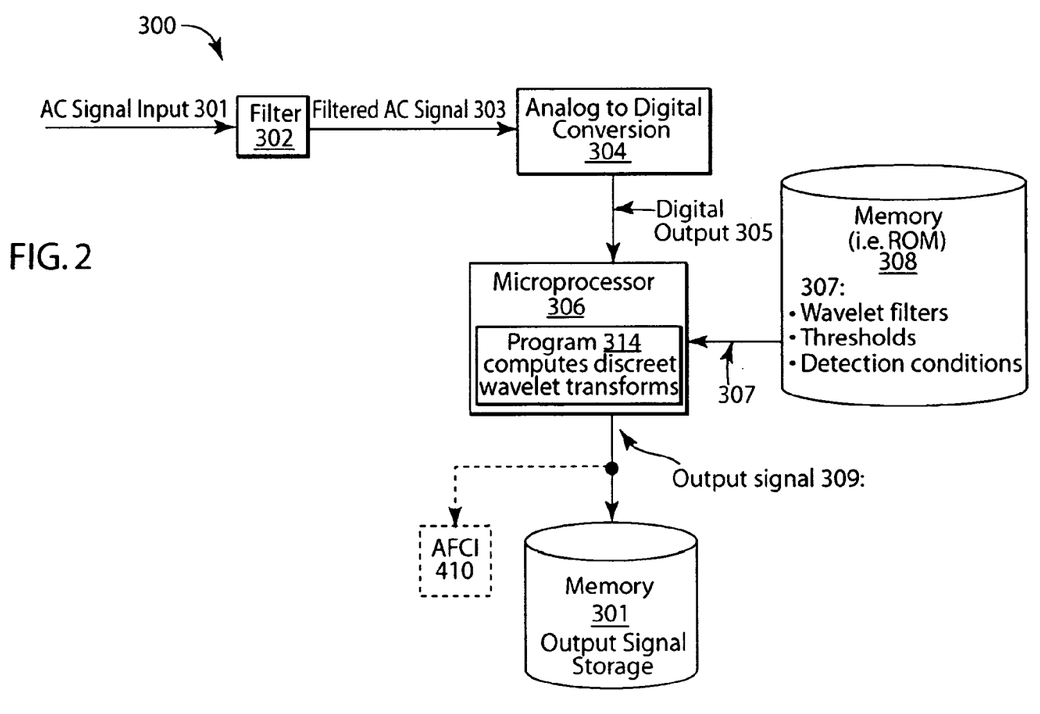
FIG. 2 illustrates a hardware functional block diagram of an exemplary embodiment of the present invention.

FIG. 2 illustrates a hardware functional block diagram 300 of an exemplary embodiment of parallel arc fault detection of the present invention. An alternating-current (AC) signal 301 is input to filter 302. A filtered signal 303 is output an analog to digital converter 304. The digital output 305 is then processed by microprocessor 306. Memory 308, for example read only memory (ROM), provides various data and programs 307 to microprocessor 306. The microprocessor 306 computes whether input signal 301 includes a parallel arc fault signal. The microprocessor output 309 indicating that a parallel arc fault is present as determined by analysis of the input signal 301 can be provided to memory 310 (such as a re-writable memory storage device as may be determined by one of ordinary skill in the art) for storage and use at a later time. Alternately, as illustrated with dashed lines, output 309 may be provided to an AFCI 410, which is described below.

Figure 4:
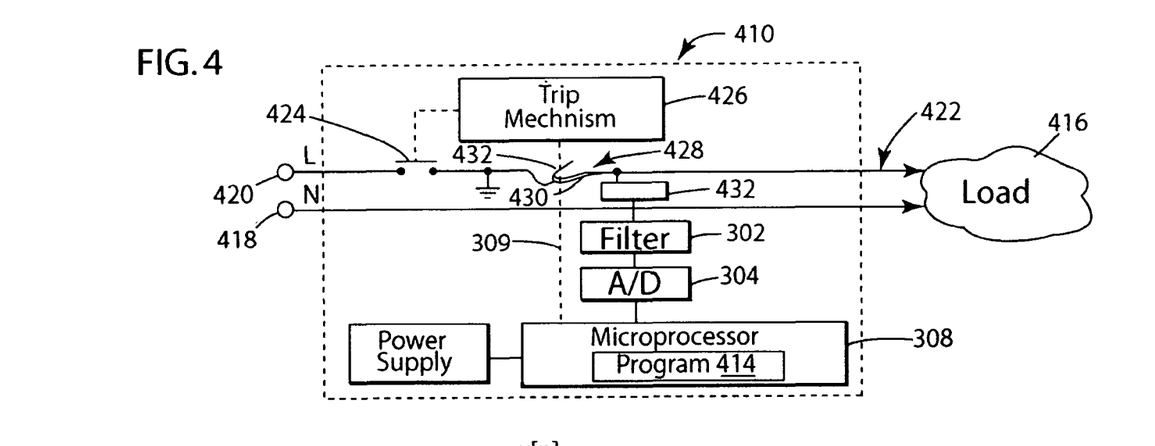
FIG. 4 illustrates a schematic of an arc fault current interrupter implementing an exemplary embodiment of the present invention.

In FIG. 4, an exemplary embodiment of an arc fault current interrupter (AFCI) according to the present disclosure is shown and is generally referred to by reference numeral 410. AFCI 410 includes a microprocessor 306 having a parallel arc fault detection program 414 resident thereon.

Advantageously, program 414, in an exemplary embodiment of the present invention, uses a discrete wavelet transform approach to parallel arc detection. Program 414 determines one or more signal features that are considered frequencies of interest. Program 414 then processes the one or more signal features to calculate a plurality of discrete wavelet transforms.

The exemplary embodiment of AFCI 410 is configured to place in a load 416 in electrical communication with a neutral conductor 418 and a line conductor 420 across a branch circuit 422. AFCI 410, via program 414, is configured to selectively open separable contacts 424 across line conductor 420 upon detection of a parallel arc fault. In this manner, AFCI 410 is adapted to detect parallel arcing in branch circuit 422 and to interrupt power to the branch circuit.

Contacts 424 are opened by a trip mechanism 426 in a known manner. For example, contacts 424 can be opened by a spring loaded trip mechanism (not shown) as is known in the art.

In addition to being activated by program 414, trip mechanism 426 can also be actuated by a conventional thermal-magnetic overcurrent device 428 having a bimetal 430 connected in series with line conductor 420. For example, bimetal 430 can bend in a known manner upon application of an overcurrent to the bimetal, which results in activation of trip mechanism 426. Additionally, bimetal 430 can include a magnetically actuated armature 432, which can activate trip mechanism 426 upon application of short circuits across the bimetal.

In some exemplary embodiments, AFCI 410 can include a conventional series arc detector 432. Series arc detector 432 is configured to activate trip mechanism 426 upon detection of series arcs across line conductor 420. Thus, program 414 of the present disclosure can work in parallel with the existing AFCI series arc detection or separate from the existing AFCI detection.

In this manner, the exemplary embodiment of AFCI 410 combines overcurrent device 428, which provides overcurrent and short circuit protection, series arc fault detector 432, which provides series arc fault detection, and in an exemplary embodiment of the present invention, program 414, which provides parallel arc fault detection.

Figure 3:
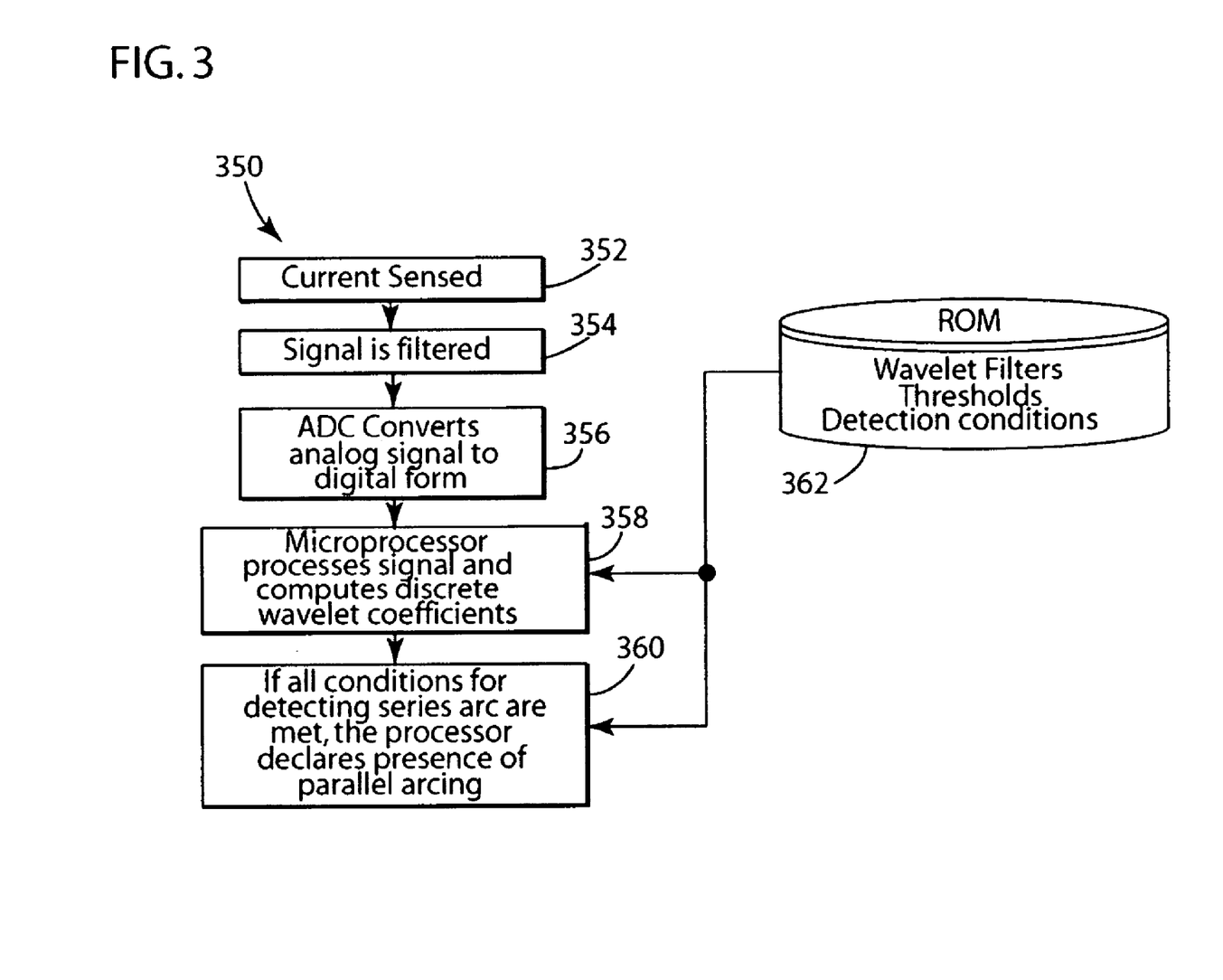
FIG. 3 illustrates a flow chart of an exemplary embodiment of the present invention.

FIG. 4 also corresponds to the process 350 of FIG. 3, which illustrates an exemplary embodiment of a method for detecting a parallel arc. Unless otherwise indicated, the method steps can be performed in any suitable order, and/or two or more steps may be performed concurrently. At 352 current is sensed. At 354 the signal is filtered, for example to remove noise. At 356 the signal is converted from analog to digital. At 358, the microprocessor processes the signal using discrete wavelet transform mathematics and computes discrete wavelet coefficients. At 350, if substantially all conditions for detecting a parallel arc fault are met, then the microprocessor signals the presence of a parallel arc fault in the input signal of 352. Memory, for example, read-only memory (ROM), interacts with the microprocessor with respect to for example, wavelet filters, thresholds and detection conditions.

Discrete Wavelet Transforms. Returning to the exemplary embodiment of FIG. 2, the microcontroller 306 runs program 314, which, using digital signal output 305 and Discrete Wavelet Transforms (DWT), computes discrete waveform coefficients as, illustrated, for example, in FIG. 5. Memory 308 provides various data and programs 307 including wavelet filters, predetermined thresholds and detection conditions to microprocessor 306. The microprocessor 306, using the discrete wavelet coefficients, determines whether input signal 301 includes a parallel arc fault signal.

A wavelet is a mathematical function that divides a given signal into various frequency components and analyzes each frequency component with a resolution that matches its scale. A wavelet transform is the representation of a signal by wavelets. Each DWT is a short wave of finite length that integrates to zero over its period of existence. In the case of the discrete wavelet transform, the wavelets are a fast-decaying oscillating waveform known as the mother wavelet. Wavelet transforms have advantages over traditional Fourier transforms (FT) and Fast Fourier Transforms (FFT) because they can represent signals having discontinuities and sharp peaks, and can accurately deconstruct and reconstruct finite, non-periodic and/or non-stationary signals and provide a measure of a correlation between the mother wavelet and the current signal.

Essentially, the discrete wavelet transform uses digital filters, as well as sufficient time resolution, to analyze various frequency components of a digital signal 305. While using the DWT on a signal, the signal is passed through a series of high pass filters to analyze high frequencies and a series of low pass filters to analyze the low frequencies.

In an exemplary embodiment, for a signal is sampled at 10 KHz to detect a parallel arc, the signal is passed through a one pole low pass filter with a cut off frequency of 900 Hz, and a one pole high pass filter with a cut off frequency of 150 Hz.

When DWT is used on a signal, two operations are performed to compute DWT coefficients; these operations are sub-sampling and filtering. Filtering changes the resolution of the signal whereas sub-sampling, including up-sampling and down-sampling, changes the scale of the signal response.

Discrete Wavelet Coefficient Calculation. In the example of the present embodiment of the invention, discrete wavelet coefficient calculation begins with a discrete time signal x[n], also known as the digital signal 305 which is input to microcontroller 306 in the exemplary embodiment of the invention illustrated in FIG. 2. The discrete wavelet coefficient calculation(s) are first performed to provide a decomposition of the signal x[n].

Regarding the discrete wavelet coefficients, there are two sets of filter coefficients. A filter is generally referred to herein in a format filter[ ], i.e. h[n] for filter h at index n where n=1, 2, 3, 4, . . . n+1. The filter coefficients for Decomposition are represented by Hi_D and Lo_D and decomposition functions of the discrete wavelet transform calculation use the same convolution illustrated in the flowchart of FIG. 7 and the equations (1), (2), (3) and (4) described herein.

Filtering. Firstly, calculating the coefficients involves passing this signal through a half band low pass digital filter with impulse response h[n]. This can be expressed mathematically in equation (1).

$$\text{Low Pass: } x_{low}[n] = x[n] * h[n] = \sum_{k=-\infty}^{\infty} x[k] \cdot h[n-k] \tag{1}$$

Secondly, the signal is also passed through a half band high pass digital filter with impulse response g[n], and is mathematically represented by equation (2).

$$\text{High Pass: } x_{high}[n] = x[n] * g[n] = \sum_{k=-\infty}^{\infty} x[k] \cdot g[n-k] \quad (2)$$

Scaling. After the filtering process of equations (1) and (2), signal resolution is halved while scale remains unchanged. The process of halving the scale is, for example, represented by equations (3) and (4), as follows:

$$\text{Resolution: } y_{high}[k] = \sum_{n} x_{high}[n] \cdot g[2k-n]; \text{ and} \quad (3)$$

$$\text{Resolution: } y_{low}[k] = \sum_{n} x_{low}[n] \cdot h[2k-n] \quad (4)$$

Filter outputs $y_{high}$ and $y_{low}$ are the result of the high pass and low pass filters, respectively, and the sub-sampling resolution changes that are the result of equations (3) and (4).

The results of equations (3) and (4) include that: 1) the time resolution is halved since only half the number of samples remain in the signal; and 2) the frequency resolution doubles since the signal retains only half the frequency band, and the frequency uncertainty is halved.

Figure 5:
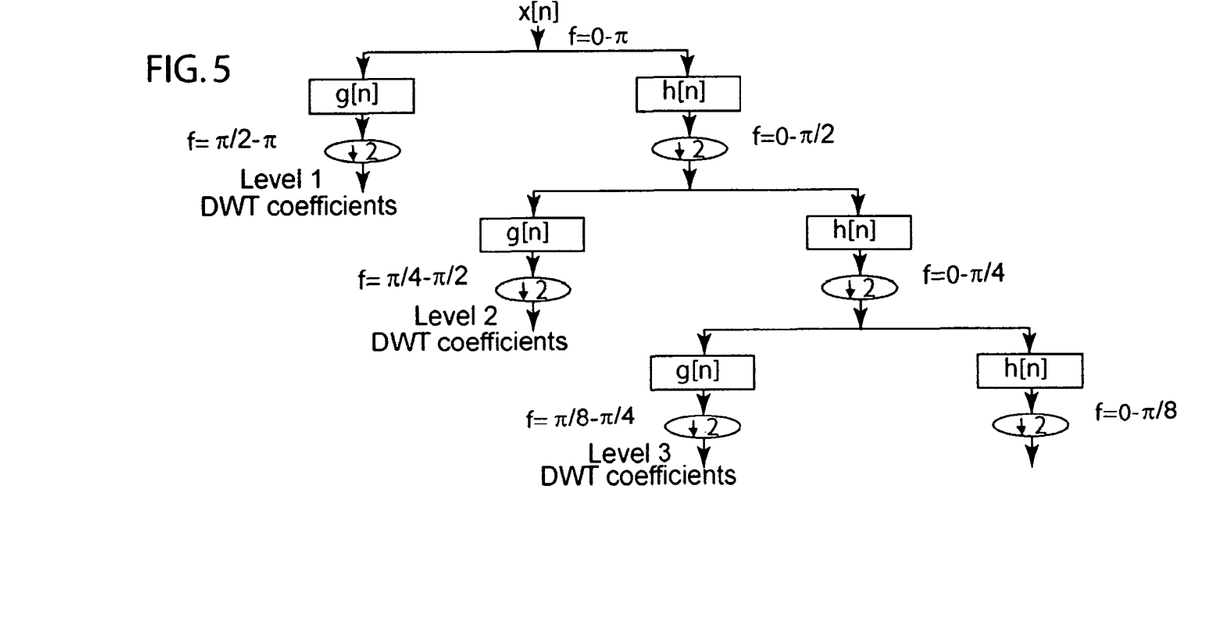
FIG. 5 illustrates a discrete wavelet transform decomposition process for exemplary embodiment of the present invention.

The calculations of equations (3) and (4), known as DWT decomposition process, may be performed for one iteration or the calculations may be repeated, as shown in FIG. 5, for "n" levels to obtain a desired time resolution and a desired frequency resolution. The level "n" may be determined by one of ordinary skill in the art in consideration of factors such as the time and frequency resolutions desired.

Figure 6:
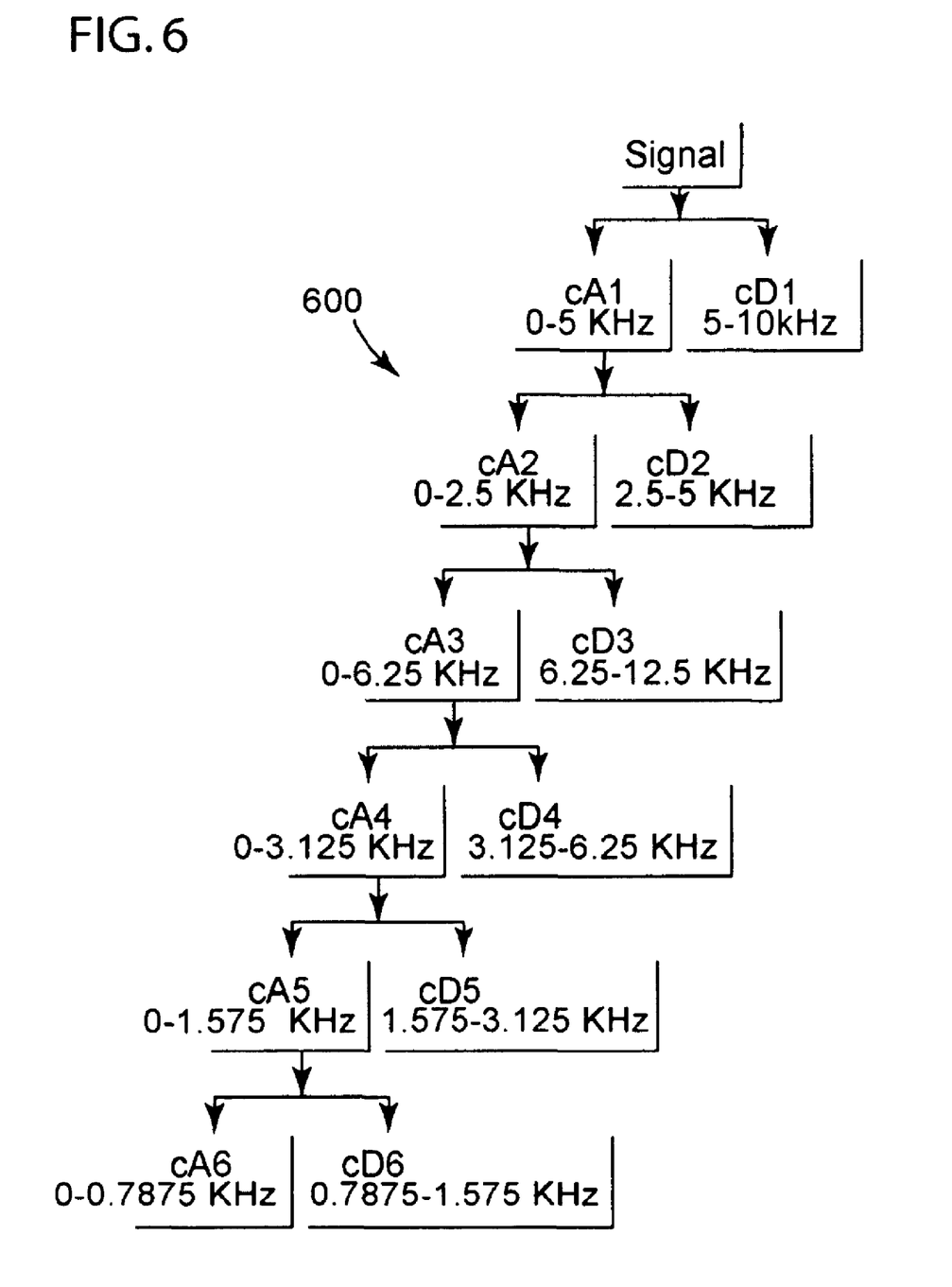
FIG. 6 illustrates a Discrete Wavelet Coefficient Tree for another exemplary embodiment of the present invention, where the number of coefficients may be to levels determined a priori.

An exemplary decomposition of a sample signal, such as digital signal 305 (FIG. 2) input to microcontroller 306 (FIG. 2), uses mother wavelets 10 Debauchies in signal magnitude. The mother wavelet is further discussed below and a general wavelet coefficient tree for decomposition calculation(s) is illustrated in FIG. 6.

Mother Wavelet. It should be noted prior to discussing the mother wavelet that the mother wavelet is part of a set of wavelets known as Daubechies wavelets. Debauchies wavelets are a family of orthogonal wavelets defining a discrete wavelet transform (DWT) and characterized by a maximum number of vanishing moments for a given signal that is the subject of the discrete wavelet transform (DWT). The mother wavelet can be chosen by one of ordinary skill in the art considering factors such as 1) the shape of the signal (i.e. sinusoidal); 2) the frequency range of concern; and 3) empirical data obtained from pre-captured waveform(s). One of ordinary skill in the art may also study vanishing points (or vanishing moments) of the mother wavelet to obtain the signal measurement of the mother wavelet.

In an exemplary embodiment, a study of the factors 1) through 3) above and the number of vanishing points or vanishing moments in the mother wavelet revealed that the ideal mother wavelet is Daubechies 10.

This wavelet coefficient tree corresponds to an exemplary sampling frequency of 10 KHz, explained above. It will be understood that the signal decomposition frequency bands are dependent on the sampling frequency. The last "n" level or final coefficients, cAn and cDn) are the coefficients of interest for the discrete wavelet transform process in general, as shown in FIG. 6.

The coefficients cAn and cDn are used in the exemplary signal decomposition explained below. One of ordinary skill in the art can determine the appropriate "n" level coefficient to calculate, as illustrated in the FIG. 6 general wavelet coefficient tree with a last or "n" level determined a priori at 602.

The filters g[n] and h[n] discussed above are Quadrature Mirror Filters (QMFFilters h[ ] and g[ ] and the mirror equation are used to obtain discrete wavelet coefficients Quadrature Mirror Filters (QMF) and are related in the following way:

$$\text{QMF Relationship: } g[L-n-1] = (-1)^n \cdot h[n] \quad (5)$$

Figure 7:
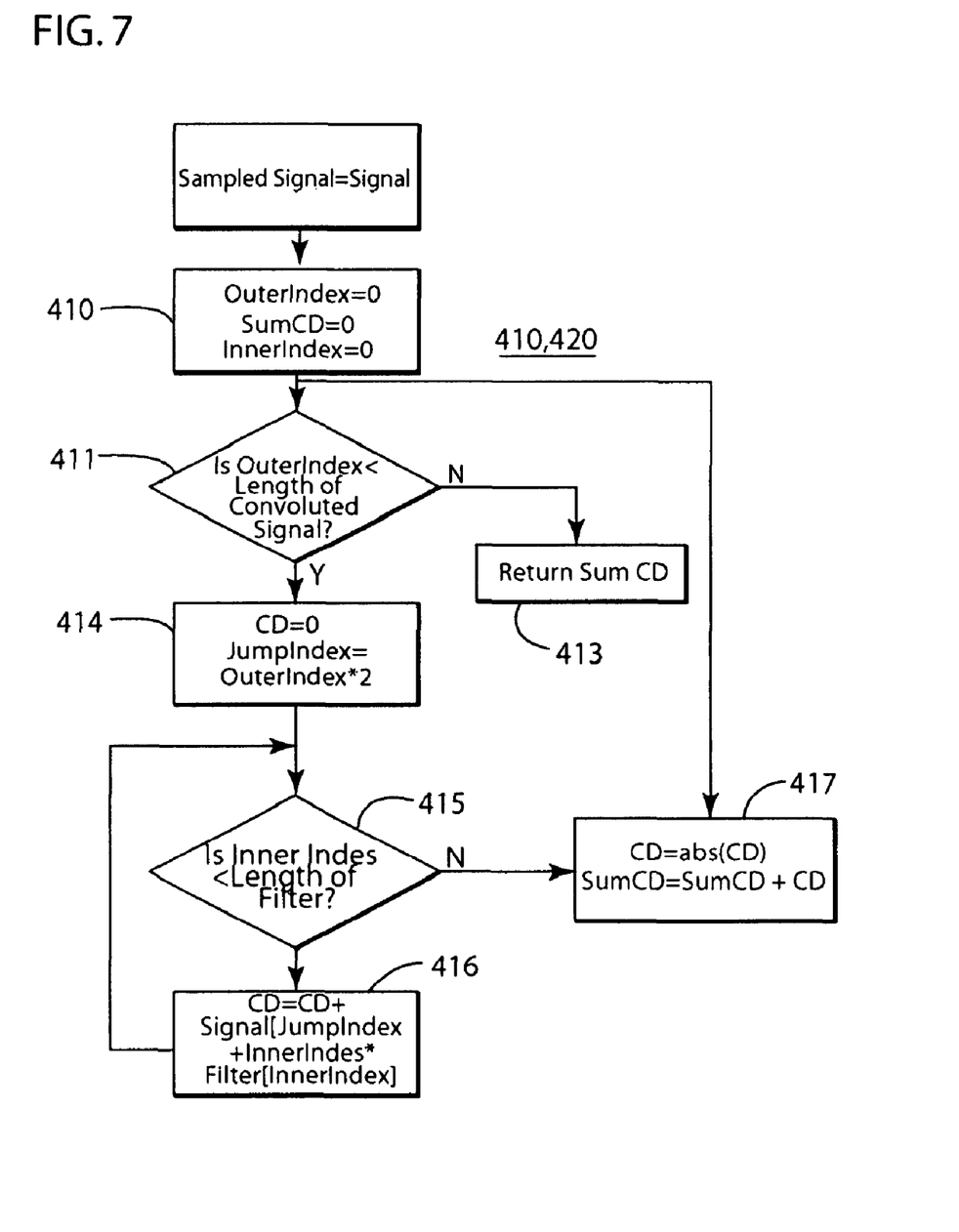
FIG. 7 is a flow diagram illustrating discrete wavelet coefficient computing algorithms.

DETAILS OF THE DWT CALCULATIONS—Here, with reference to FIG. 7, the discrete wavelet algorithm is employed in operations 410 through 417. As shown, the sampled signal is initially defined as a signal with the OuterIndex, which refers to an index for the convoluted signal, the SumCD, which is the absolute value of the sum of detailed coefficients, and the InnerIndex, which is an index of a filter in use, each being set to zero (operation 410).

First, whether the OuterIndex is less than a length of the convoluted signal is determined (decision 411). If the OuterIndex is not less than a length of the convoluted signal, a value of the SumCD is returned to zero (operation 413). Conversely, if the OuterIndex is less than a length of the convoluted signal, values of the CDs, which are the individual detailed coefficients, are set to zero and a value of a JumpIndex is set to a value of the convoluted signal multiplied by two (operation 414).

Then, whether the InnerIndex is less than a length of the filter is determined (decision 415). If the InnerIndex is less than a length of the filter, the values of the CDs are set to the values of the CDs added to a value of the signal (operation 416). Here, the signal value is a value of the JumpIndex added to a value of the InnerIndex multiplied by a value of the filter. This process is repeated until the InnerIndex is determined to not be less than a length of the filter (decision 415). At this point, the values of the CDs are set to the absolute values of the CDs and the value of the SumCD is set to the absolute value of the SumCD added to the values of the CDs (operation 417).

Figure 8:
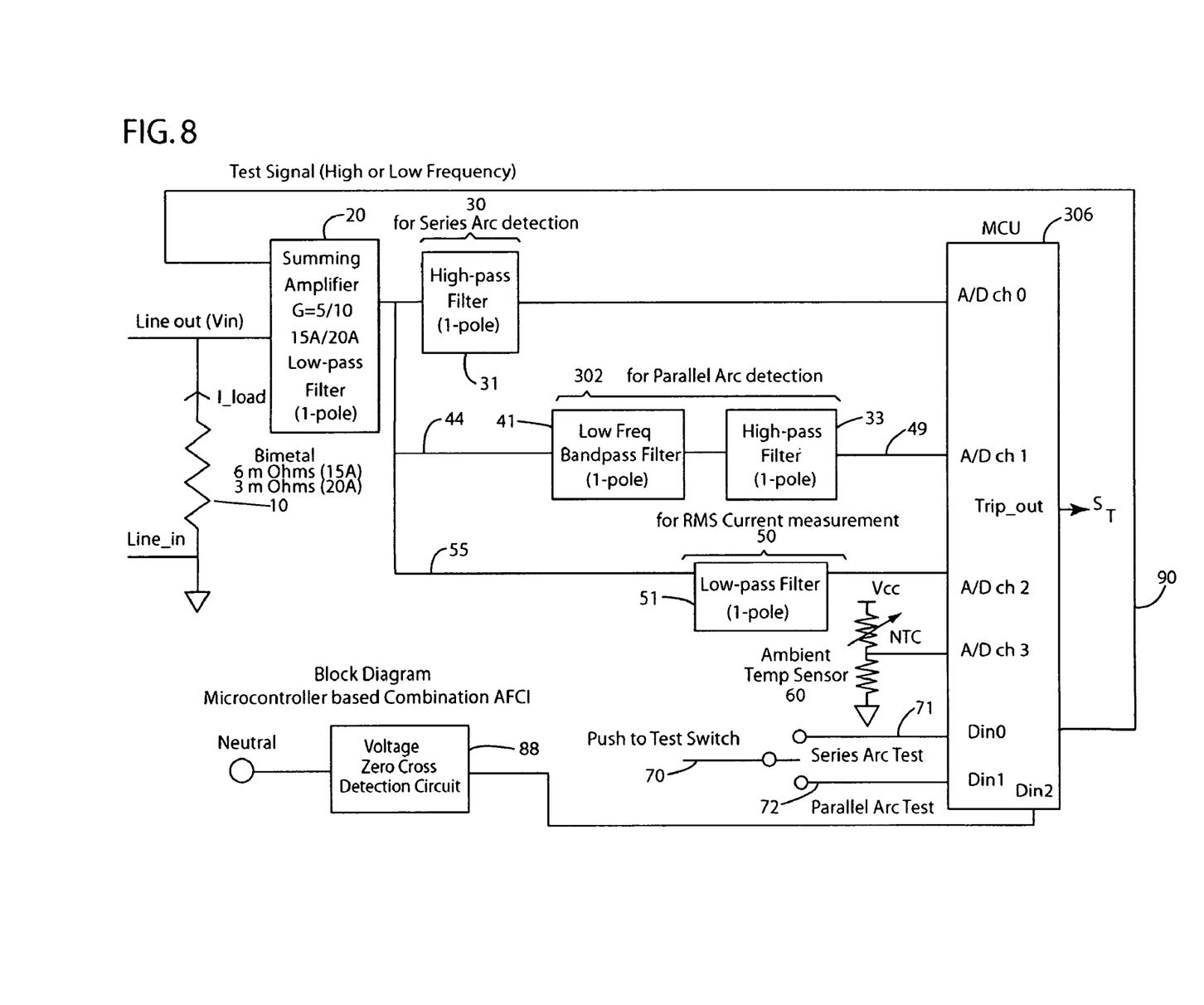
FIG. 8 illustrates a schematic diagram of an embodiment of a microcontroller based arc fault detector of the present invention.

With reference to FIG. 8, an apparatus 1 to perform parallel arc fault current interruption (AFCI) is provided. The apparatus 1 of FIG. 8 includes a current sensor 10 comprising a resistive element 10, such as a bimetal, which is configured to sense a load from which a current signal is generated The current sensor 10 bimetal may be formed of resistive materials that have a characteristic resistance at room temperature of 6 mOhms (milli-ohms) (at 15 A) or 3 mOhms (at 20 A). While embodiments of the invention are disclosed having a bimetal as an example resistive element, it will be appreciated that the scope of the invention is not so limited and also encompasses other resistive elements suitable for the purposes disclosed herein, such as, for example, brass, bronze, copper alloy, steel, stainless steel, inconel steel and/or carbon-steel alloys. Moreover, the current sensor may also optionally comprise a root mean square (RMS) current measurement unit, a peak-to-peak (p-p) current measurement unit, a Hall effect current sensor, a current transformer, or any other suitable device.

Optionally, the output signal, from current sensor 10 may be communicated to an active low pass filter 20 on signal line 55. In addition, a test signal 90, which may be provided by a microcontroller 306, for example, may also be provided to the summing active low pass filter 20. In one embodiment the RMS measurement comprises an active low pass filter 20 that unit operates at a sampling rate of 10 kHz and filters all but those sub-signals having frequencies of about 6 kHz-60 Hz from the current signal. In other embodiments, the output signal from current sensor 10 may be communicated to the parallel arc detection unit 302 on parallel arc signal line 44.

The signal output from the summing filter 20 is communicated to parallel arc signal line 44, and RMS current signal line 55. A parallel arc detection unit 302 is disposed on signal line 44 and a current measurement unit 50, is disposed on signal line 55. The parallel arc detection unit 302 is configured as a filter to output a first signal via a parallel arc signal channel 49 to a microcontroller 306 for use in detecting a parallel arc in the current signal. The current measurement unit 50 is configured to output a second signal to the microcontroller 306 for use in the performance of, e.g., RMS current measurement and arc detection sample timing. In other embodiments, current measurement unit 50 optionally comprises a root mean square current measurement unit, a p-p current measurement unit, a Hall effect current sensor or any other suitable device.

In other embodiments, the output signal from current sensor 10 may be communicated directly to the parallel arc detection unit 302 on parallel arc signal line 44. Optionally, the test signal 90 may also be provided directly to the parallel arc detection unit 302. In one embodiment, the parallel arc detection unit 302 operates at a sampling rate of 10 kHz and filters all but those sub-signals having frequencies of about 150-900 Hz from the current signal. To this end, the parallel arc detection unit 302 includes a low pass filter 41 and a high pass filter 42.

In one embodiment, the microcontroller 306 is configured to process the second signal as received from the current measurement unit 50 to determine an indication of the current magnitude. More specifically, the second signal as received from the current measurement unit 50 is processed to identify if any samples are above or below a predetermined range of values. In one embodiment, Microcontroller 306 samples the second signal as received from the current measurement unit 50 at a rate of about 10 KHz and computes root mean sum of squares. For example, it will be understood that after removing the DC bias, taking the root sum of squares of each reading and using a 12-bit Analog to Digital Converter (ADC) resident in Microcontroller 306 having saturation levels of 0 counts and 4060 counts, if a current signal as received from the current measurement unit 50 measuring 0 amperes reads 2048 counts, then a RMS current count below 36, (i.e., relatively close to the ADC saturation level of 0) is thus understood to indicate a relatively large negative current, and a RMS current count above 4060, (i.e. relatively close to the ADC saturation level of 4096) is thus understood to indicate a large positive current.

In other embodiments, the parallel arc detection apparatus may additionally incorporate or be combined with various other fault detection methods and apparatus, such as for example, a series arc fault detection unit 30 comprising, for example, a high-pass filter 31 in signal communication with the microcontroller 306.

The apparatus 1 further includes a zero-cross detection circuit 88 coupled to a neutral line 12 to provide signal indication of the voltage zero cross points to microcontroller 306. As shown in FIG. 8, the zero cross detect circuit 88 is sourced from the AC voltage powering microcontroller 306 and coupled to a neutral line. Such zero cross detect circuits 88 are known and are capable of various configurations understood by those of ordinary skill in the art. It will also be understood that the apparatus 1 can alternatively be configured to provide an indication of zero cross to microcontroller 306 in a variety of ways well known in the art including, for example, as a current zero-cross detection circuit.

The microcontroller 306 is configured to decompose the first signal as received from the parallel arc detection unit 302. In accordance with embodiments of the invention, the decomposition is accomplished via the discrete wavelet transforms (DWTs), such as mother wavelets, that are obtained from external computations and at least partly from information contained within the second signal as received from the current measurement unit 50.

Thus, when the microcontroller 306 applies DWTs to a parallel arc detection operation, the microcontroller 306 may operate by identifying a pattern or a signature that can be associated with the arcing, selecting a predetermined mother wavelet that gives a close correlation to that pattern or signature, selecting a frequency range to analyze the arcing that provides an optimized signal-to-noise ratio, selecting a portion of the waveform as the focus area and selecting the required window size that corresponds to the selected portion of the waveform.

A result of the decomposition is the computation of discrete wavelet coefficients which are themselves employed by the microcontroller 306 in the determination of the presence of a parallel arc and in the issuance of a trip signal. That is, the microcontroller 306 is preferably configured to generate a trip signal when the integrated discrete wavelet coefficients indicate that one or more threshold conditions for trip signal generation are satisfied. Here, the threshold condition refers to a signal measurement that indicates that a parallel arc occurs.

The microprocessor 306 is configured to compute the DWT coefficients as previously described and compute the sum of the absolute value of the DWT coefficients (SumCDs). The SumCD value is considered a relative indication of the arcing content of the measured signal. Microprocessor 306 is further configured to compare the computed SumCD value to a predetermined value referred to as the Coefficient Threshold (CT). The CT provides a relative indication of the baseline noise level of SumCDs. Microprocessor 306 preferably includes an integrator function having a value that is increased or decreased at a predetermined rate depending on the difference between the SumCD and CT values. Preferably, if the half cycle SumCD is less than the CT, the integrator value will decrement by a predetermined percentage of its current value, for example, integrator value=(integrator value)−(integrator value/32)). If the half cycle SumCD value is greater then the CT value, the CT value is subtracted from the SumCD value and then added to the integrator value. The comparisons and integration is repeated over subsequent half cycles. If the integrator value is determined to be above a predetermined integrator threshold (IT) value, a parallel arcing condition is determined to be present.

It will be understood that the CT values can be determined any number of ways, such as by conducting parallel arcing tests in accordance with industry standards, such as Standard UL 1699, and comparing with tests conducted on known high inrush current loads, such as a compressor motor load.

Still referring to FIG. 8, the apparatus may further include an ambient temperature sensor 60 that is coupled to the microcontroller 306. The ambient temperature sensor 60 measures the ambient temperature of, at least the resistive element 10 and outputs the measurement to the microcontroller 306. The microcontroller 306 then determines whether to compensate for any temperature changes of the resistive element 10 in the calculations mentioned above.

In addition, the apparatus may further include a test switch 70 such as for example a push type switch. The push to test switch 70 is coupled to the microcontroller 306 through parallel arc test line 72 and allows an operator to test the apparatus upon installation in accordance with local and non-local regulations. As discussed above, in other embodiments, the parallel arc detection apparatus may also incorporate or be combined with various other fault detection methods and apparatus. For example, test switch 70 may additionally comprise a series arc test line 71 in signal communication with the microcontroller 306.

Figure 9:
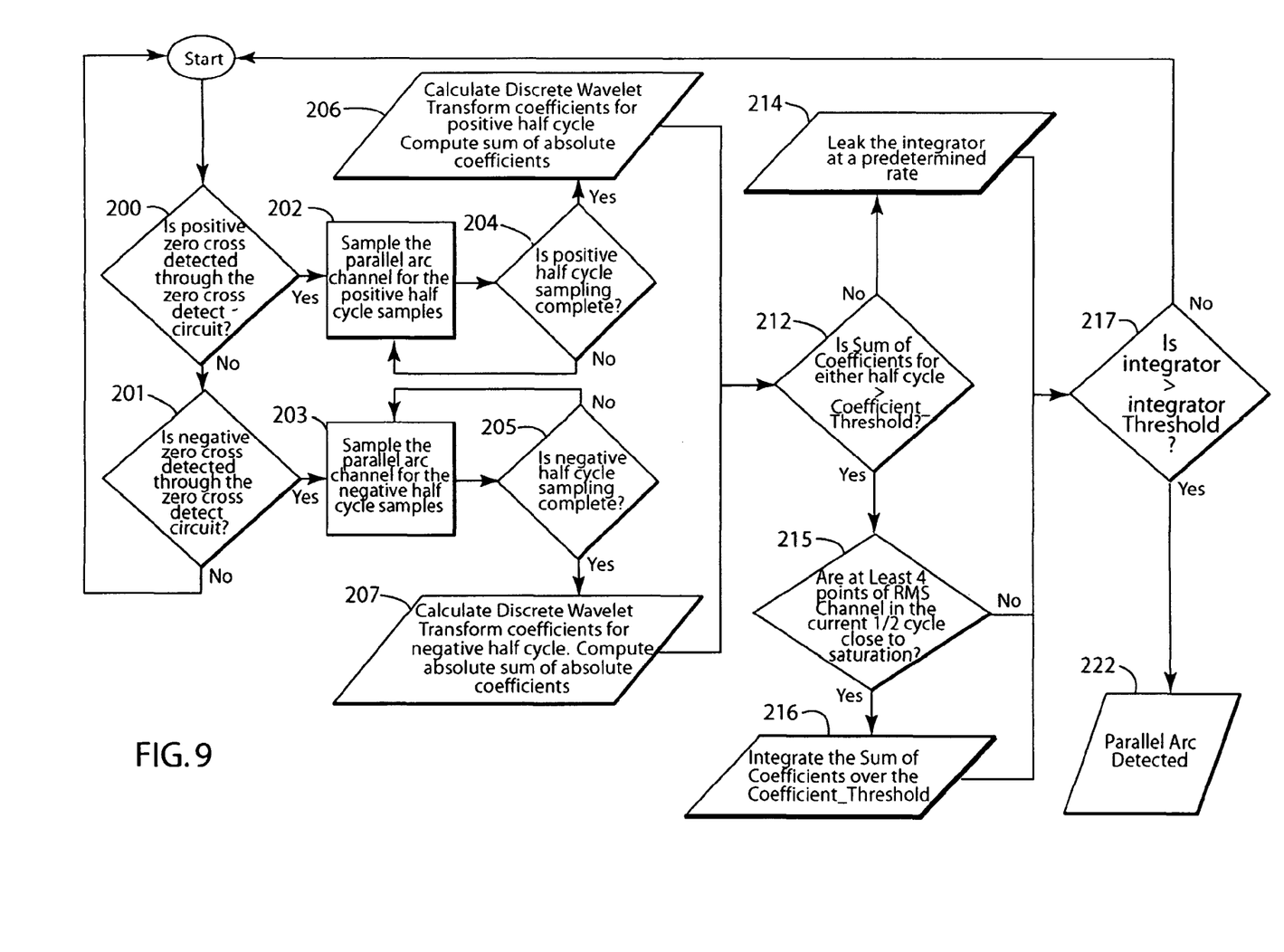
FIG. 9 illustrates an exemplary method for detecting parallel arcing described herein.
Figure 10:
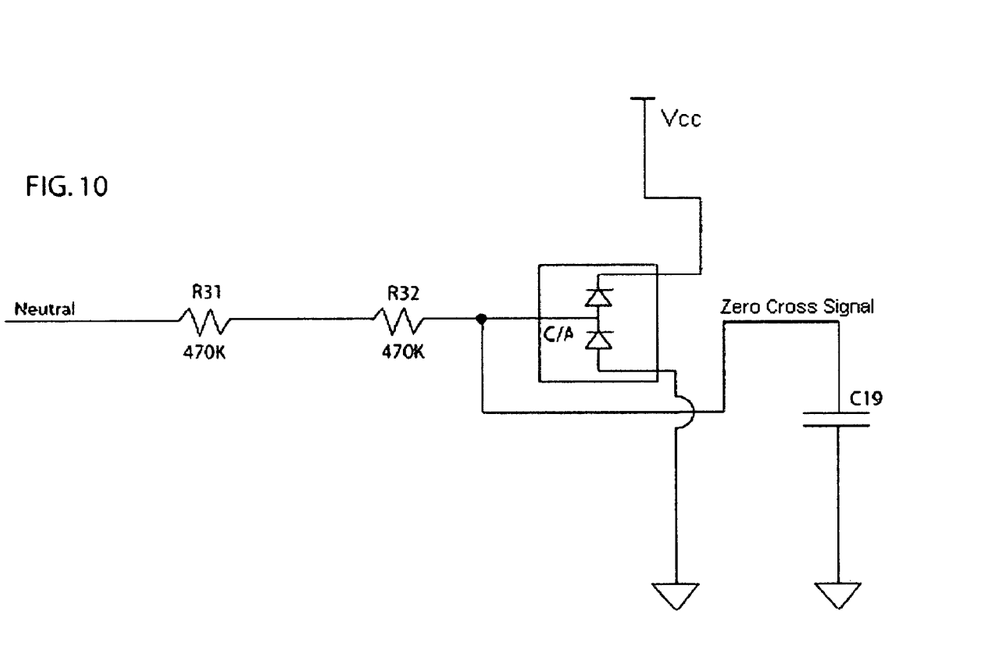
FIG. 10 illustrates a schematic diagram of an exemplary form of a zero cross detection circuit.

With reference now to FIG. 9, a method of performing parallel arc fault current interruption (AFCI) will be described. The algorithm therein preferably will run continuously until a parallel arc is detected. As shown in FIG. 9, upon initialization of the algorithm (operation 100), sensing for one power cycle of data of a load current occurs, and a determination is made as to whether a positive zero cross is detected through the zero cross detect circuit 88 (decision 200, 201).

The signal is preferably filtered to remove undesired components using, for example filter 302 (FIG. 2). The signal output from filter 302 (FIG. 2) is used in calculation(s) of discrete wavelet coefficients at operator 206, 207. The discrete wavelet coefficient calculation(s) begin with a discrete time signal x[n], also known as the digital signal 305 (FIG. 2) which is input to microprocessor 306 (FIG. 2) in an exemplary embodiment of the invention illustrated in FIG. 3.

Referring again to FIG. 9, it will be understood that the one power cycle of data may alternatively be considered as comprising a positive half cycle and a negative half cycle. The discrete wavelet coefficient calculation(s) are preferably calculated separately for a positive half cycle and a negative half cycle.

If the positive zero cross has been detected, then sampling of the parallel arc channel 49 for the positive half cycle samples begins (operation 202). Once the positive half cycle sampling is determined to be complete (decision 204), the Discrete Wavelet Transform coefficients are calculated for the positive half cycle, and the sum of the absolute coefficients is computed (operation 206).

If the positive zero cross has not been detected (decision 200), a determination is made as to whether a negative zero cross is detected through the zero cross detect circuit 88 (decision 201). If the negative zero cross has been detected, then sampling of the parallel arc channel 49 (FIG. 8) for the negative half cycle samples begins (operation 203). Once negative half cycle sampling is determined to be complete (decision 205), the Discrete Wavelet Transform coefficients are calculated for the negative half cycle and the sum of the absolute coefficients are computed (operation 207).

Referring again to FIG. 9, the calculated discrete waveform coefficient values for both positive and negative half cycles are analyzed to determine if the sum of the discrete waveform coefficients for either half cycle is greater than a predetermined coefficient threshold (decision 212). If so, it is then determined whether there are sufficient number of points of the sampled RMS signal in the current half cycle with counts that are outside (i.e. above or below) a predetermined range (decision 215). For example, if there are 4 or more points of the sampled RMS signal sufficiently high or low (with respect to the predetermined range), then the sampled RMS signal is considered to be in saturation. If so, the sum of the coefficients are integrated over the predetermined coefficient threshold (operation 216).

If it is determined that the sum of the discrete waveform coefficients for either half cycle is less than a predetermined coefficient threshold (operation 212), then the integrator is reduced by a predetermined amount (operation 214).

Lastly, with reference to FIG. 9, it is determined whether all threshold criteria have been met (operation 217) based on the zero and non-zero cross discrete wavelet coefficients. If the threshold criteria are determined to have been met a trip signal is issued (operation 222). Here, the determination of threshold criteria being met is accomplished by comparing the integrator value with the predetermined integrator threshold, and determining whether the integrator value exceeds the predetermined integrator threshold.

An embodiment of the invention may be embodied in the form of computer-implemented processes and apparatuses for practicing those processes. The present invention may also be embodied in the form of a computer program product having computer program code containing instructions embodied in tangible media, such as floppy diskettes, CD-ROMs, hard drives, USB (universal serial bus) drives, or any other computer readable storage medium, such as random access memory (RAM), read only memory (ROM), or erasable programmable read only memory (EPROM), for example, wherein, when the computer program code is loaded into and executed by a computer, the computer becomes an apparatus for practicing the invention. The present invention may also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing the invention. When implemented on a general-purpose microprocessor, the computer program code segments configure the microprocessor to create specific logic circuits. A technical effect of the executable instructions is to receive and to decompose a secondary signal into first and second coefficients, and to generate a trip signal for use in interrupting an operation of an electrical circuit when the magnitude of the sensed load current is above a predetermined threshold and the sum of the discrete wavelet coefficients cooperatively indicate that predetermined threshold conditions for trip signal generation are satisfied.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular exemplary embodiment disclosed as the best mode contemplated for carrying out this disclosure, but that the disclosure will include all embodiments falling within the scope of the appended claims.

What is claimed is:

1. An apparatus for interrupting current in an electrical circuit, the apparatus comprising:
   a current sensing device disposed in the electrical circuit to sense an electrical load, the current sensing device configured to produce an output signal representative of a load current passing therethrough;
   a detection unit, in signal communication with the current sensing device and configured to receive the output signal produced by the current sensing device, the detection unit being configured and disposed to output a secondary signal based on the output signal, the secondary signal comprising a positive half cycle and a negative half cycle; and a microcontroller coupled to the detection unit, being responsive to computer executable instructions which, when executed by the microcontroller, cause the microcontroller to receive and to decompose the secondary signal for the positive half cycle via discrete wavelet transforms to thereby obtain discrete wavelet coefficients for the positive half cycle, and to decompose the secondary signal for the negative half cycle via discrete wavelet transforms to thereby obtain discrete wavelet coefficients for negative half cycle, and to compute a sum of the discrete wavelet coefficients for the positive half cycle and the negative half cycle, and to compare the sum of the discrete wavelet coefficients for the positive half cycle and the negative half cycle to a predetermined threshold, and to generate a trip signal when the sensed load current is above a predetermined threshold and the sum of the discrete wavelet coefficients for at least one of the positive half cycle and the negative half cycle cooperatively indicate that predetermined threshold conditions for trip signal generation are satisfied.

2. The apparatus of claim 1, further comprising:
a current measurement unit, configured to output to the microcontroller a measurement signal, which is related to a timing of the output signal and which is employed by the microcontroller in a determination of whether the threshold conditions are satisfied.

3. The apparatus of claim 1, further comprising:
an ambient temperature sensor coupled to the microcontroller by which the microcontroller determines whether to compensate for temperature changes of the current sensing device.

4. The apparatus of claim 1, further comprising a summing amplifier operably disposed between the current sensing device and the detection unit and in signal communication with the microcontroller,
wherein the summing amplifier includes a filter, and wherein the filter and the detection unit are configured to cooperatively filter components of the secondary signal having frequencies outside of a range of about 150-900 kHz from the secondary signal.

5. The apparatus of claim 1, wherein the discrete wavelet coefficients are obtained from components of the secondary signal having frequencies in a range of about 5-10 kHz.

6. The apparatus of claim 1, further comprising a detection circuit, disposed in signal communication with the microcontroller, wherein the detection circuit is further configured and disposed to detect a zero cross instance of the output signal voltage and to instruct the microcontroller to subsequently decompose the secondary signal.

7. The apparatus of claim 1, wherein the microcontroller further comprises an integrator.

8. The apparatus of claim 7, wherein the sum of the discrete wavelet coefficients is integrated over a predetermined coefficient threshold.

9. The apparatus of claim 8, wherein the microprocessor issues a trip signal for use in interrupting an operation of the electrical circuit when the sensed load current is above a predetermined threshold and the value of the integrator is above a predetermined threshold condition.

10. A computer implemented method of performing arc fault current interruption (AFCI) for a circuit, the method comprising:
sensing a load current at a current sensing device in electrical communication with the circuit;
generating a secondary signal comprising a positive half cycle and a negative half cycle and being reflective of a current of the sensed load current at a detection unit in signal communication with the current sensing device;
sampling the positive half cycle of the secondary signal at a predetermined frequency at a microcontroller coupled to the detection unit;
sampling the negative half cycle of the secondary signal at a predetermined frequency at a microcontroller coupled to the detection unit;
determining the magnitude of the secondary signal;
computing discrete wavelet coefficients from the positive half cycle components of the secondary signal
computing discrete wavelet coefficients from the negative half cycle components of the secondary signal;
computing a sum of the computed positive half cycle and the negative half cycle discrete wavelet coefficients;
comparing the sum of the computed positive half cycle and the negative half cycle discrete wavelet coefficients to a predetermined threshold;
determining if threshold criteria have been met based on the magnitude of the secondary signal and at least one of the sum of the positive half cycle or the negative half cycle discrete wavelet coefficients; and if so,
issuing a trip signal to interrupt an operation of the circuit.

11. The method of claim 10, further comprising:
sensing an ambient temperature relative to the current sensing device; and compensating for changes of the ambient temperature.

12. The method of claim 10, further comprising:
filtering the secondary signal to exclude frequencies outside of a range of about 150-900 kHz from the secondary signal.

13. The method of claim 10, wherein, if the sampling of the secondary signal at the predetermined frequency is determined to not be complete or if the predetermined threshold is determined to have not been met:
continuing the sampling of the secondary signal at the predetermined frequency.

14. The method of claim 10, further comprising:
triggering the sampling of the secondary signal when the secondary signal voltage registers a positive or negative zero cross.

15. The method of claim 10, further comprising:
integrating, over a predetermined coefficient threshold, the sum of the discrete wavelet coefficients to determine an integrator value.

16. The method of claim 15, further comprising
reducing the integrator value at a predetermined rate; and wherein the determining if threshold criteria have been met further comprises comparing the integrator value with a predetermined integrator value threshold.

17. The method of claim 15, wherein the determining if threshold criteria have been met further comprises:
comparing the integrator value with a predetermined integrator value threshold.

* * * * *